(12) United States Patent
VanderVelde et al.

(10) Patent No.: US 6,384,336 B1
(45) Date of Patent: May 7, 2002

(54) DEVICE BRACKET

(75) Inventors: Charles VanderVelde, Frankfort; Robert Nicoli, Glenwood, both of IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/550,343

(22) Filed: Apr. 14, 2000

Related U.S. Application Data

(60) Provisional application No. 60/130,852, filed on Apr. 22, 1999.

(51) Int. Cl.[7] .................................................. H02G 3/04
(52) U.S. Cl. ............................. 174/95; 174/48; 174/66; 220/3.92; 220/4.02
(58) Field of Search ........................... 174/48, 49, 53, 174/68.3, 95, 96, 101, 66; 220/3.3, 3.92, 3.94, 4.02; 248/27.1, 27.3; 439/113, 114, 211

(56) References Cited

U.S. PATENT DOCUMENTS

| | | | | |
|---|---|---|---|---|
| 1,534,723 A | * | 4/1925 | Lewis | 220/4.02 |
| RE19,092 E | * | 2/1934 | Despard | 174/48 |
| 2,028,509 A | * | 1/1936 | Knell | 220/4.02 |
| 2,455,231 A | | 11/1948 | Clayton | |
| 3,592,956 A | * | 7/1971 | Fork | 174/96 |
| 4,059,328 A | | 11/1977 | Rigo | |
| 4,166,195 A | | 8/1979 | Schwab | |
| 4,591,656 A | | 5/1986 | Mohr | |
| 4,800,695 A | | 1/1989 | Menchetti | |
| 4,952,163 A | | 8/1990 | Dola et al. | |
| 5,010,211 A | * | 4/1991 | Bartee | 174/48 |
| 5,086,194 A | * | 2/1992 | Bruinsma | 174/48 |
| 5,336,849 A | * | 8/1994 | Whitney | 174/48 |
| 5,486,650 A | * | 1/1996 | Yetter | 174/53 |
| 5,614,695 A | | 3/1997 | Navazo | |
| 5,685,113 A | | 11/1997 | Reuter et al. | |
| 5,700,978 A | * | 12/1997 | Huff | 174/66 |
| 5,784,841 A | | 7/1998 | Nowell | |
| 5,833,110 A | * | 11/1998 | Chandler et al. | 220/3.9 |
| 5,981,875 A | * | 11/1999 | Kesler et al. | 174/66 |
| 5,998,732 A | * | 12/1999 | Caveney et al. | 174/48 |
| 6,005,189 A | * | 12/1999 | Anker | 174/66 |
| 6,145,683 A | * | 11/2000 | Taniguchi | 220/4.02 |
| 6,211,460 B1 | * | 4/2001 | Hull et al. | 174/48 |
| 6,259,020 B1 | * | 7/2001 | Ashline et al. | 174/48 |

* cited by examiner

Primary Examiner—Dean A. Reichard
Assistant Examiner—Adolfo Nino
(74) Attorney, Agent, or Firm—Robert A. McCann; Jay A. Saltzman

(57) ABSTRACT

A device bracket system with a main body that includes a top with an aperture and a longitudinal side depending from the top and having a first end and a second end. An electrical receptacle or a communication receptacle is mounted to the main body and aligned with the aperture. A first mounting assembly is attached to the longitudinal side and being positioned so as to be nearer to the first end of the longitudinal side and so that a gap is formed between the first mounting assembly and the first end of the longitudinal side. A second mounting assembly is attached to the longitudinal side and spaced from the first mounting assembly, wherein the second mounting assembly has a longitudinal dimension that is less than or equal to a longitudinal dimension of the gap.

32 Claims, 5 Drawing Sheets

DEVICE BRACKET

Applicants claim, under 35 U.S.C. § 119(e), the benefit of priority of the filing date of Apr. 22, 1999, of U.S. Provisional Patent Application Ser. No. 60/130,852, filed on the aforementioned date, the entire contents of which are incorporated herein by reference.

BACKGROUND OF THE INVENTION

1. Field of the Invention

The present invention relates generally to a structure for mounting electrical power or communication devices in the top opening of a surface raceway system, and more specifically to a unique, reversible bracket which may be used singularly or in a plurality to mount electrical power or communication receptacles immediately disposed in a side-by-side manner laterally aligned on the raceway.

SUMMARY OF THE INVENTION

A first aspect of the present invention regards a device bracket system with a main body that includes a top with an aperture and a longitudinal side depending from the top and having a first end and a second end. An electrical receptacle or a communication receptacle is mounted to the main body and aligned with the aperture. A first mounting assembly is attached to the longitudinal side and being positioned so as to be nearer to the first end of the longitudinal side and so that a gap is formed between the first mounting assembly and the first end of the longitudinal side. A second mounting assembly is attached to the longitudinal side and spaced from the first mounting assembly, wherein the second mounting assembly has a longitudinal dimension that is less than or equal to a longitudinal dimension of the gap.

A second aspect of the present invention regards a device bracket and raceway system that has a raceway that includes a base, a first sidewall attached to and extending upward from the base, a second sidewall attached to and extending upward from the base and a divider attached to and extending upward from the base, wherein the divider is positioned between the first and second sidewalls. A device bracket is not attached to the first sidewall. The device bracket includes a top having an aperture, a longitudinal side attached to the top and having a first end and a second end and a first mounting assembly attached to the longitudinal side and the divider. An electrical receptacle or a communication receptacle mounted to the device bracket and aligned with the aperture.

A third aspect of the present invention regards a device bracket and raceway system device bracket and raceway system that has a raceway that includes a base, a first sidewall attached to and extending upward from the base, a second sidewall attached to and extending upward from the base and a divider attached to and extending upward from the base, wherein the divider is positioned between the first and second sidewalls. A first device bracket is attached to the first sidewall and is not attached to the second sidewall. The first device bracket includes a first longitudinal side having a first end and a second end and a first mounting assembly attached to the first longitudinal side and the divider. A second device bracket is attached to the second sidewall and is not attached to the first sidewall. The second device bracket includes a second longitudinal side having a third end and a fourth end, wherein the second longitudinal side faces the first longitudinal side and is separated therefrom by the divider. A second mounting assembly is attached to the second longitudinal side and the divider, wherein the second mounting assembly is offset from the first mounting assembly.

Details of the invention will be further explained in what follows by means of the embodiment represented in the drawings.

DETAILED DESCRIPTION OF THE INVENTION

Figure 1:
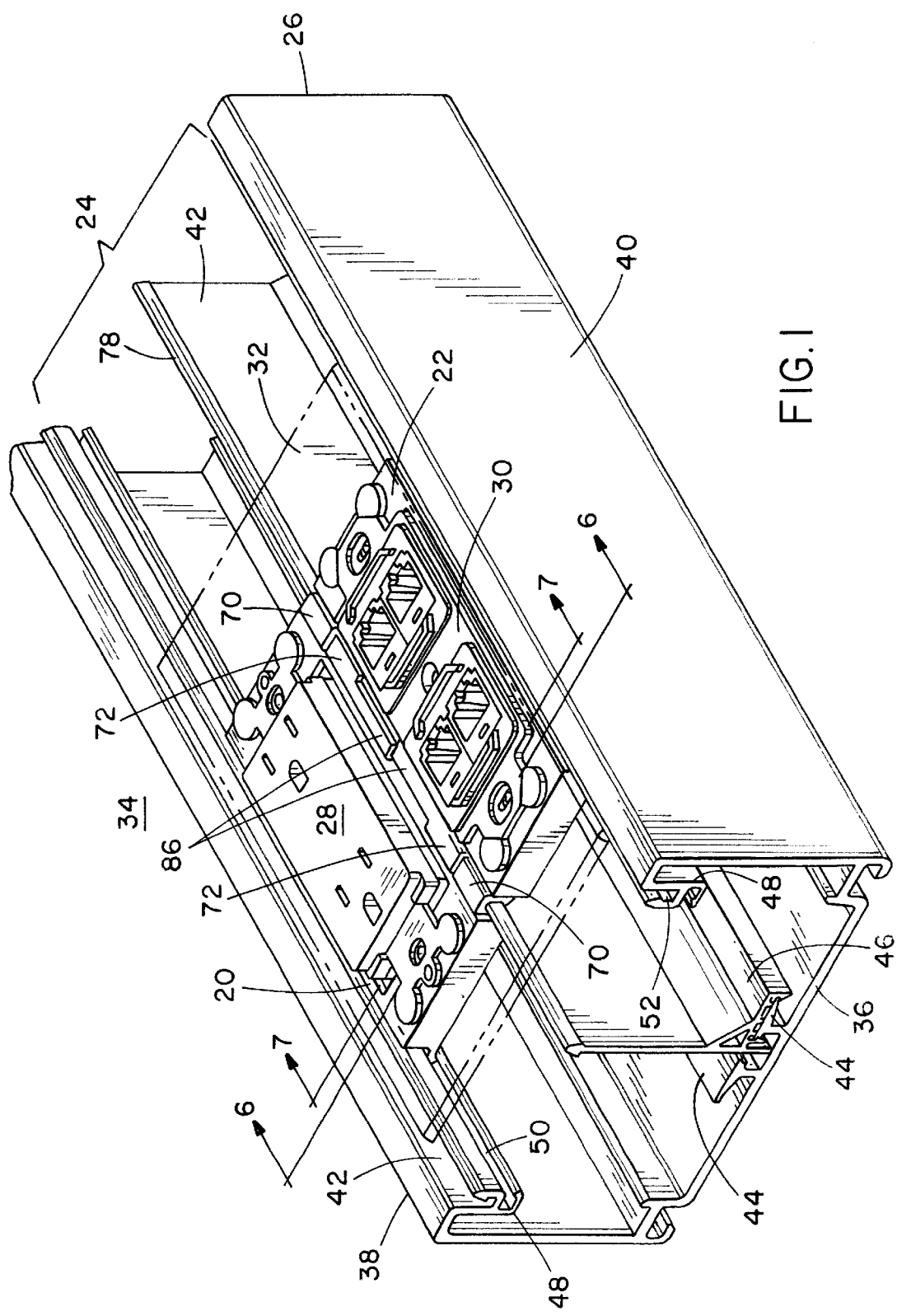
FIG. 1 is a top perspective view of device bracket and surface raceway system in accordance with an embodiment of the present invention.

FIG. 1 is a top perspective view of a pair of device brackets 20, 22 installed and assembled in cooperation with a top opening 24 of a surface raceway system 26. An electrical receptacle 28 is mounted in a conventional manner to one bracket 20, and a communication receptacle 30 is mounted in the other bracket 22. A faceplate 32, shown in phantom, is attached to the raceway 26 in a conventional manner to provide an aesthetic cover for the respective receptacles and to cover the ends of each raceway cover (not shown) when fully assembled.

Figure 2:
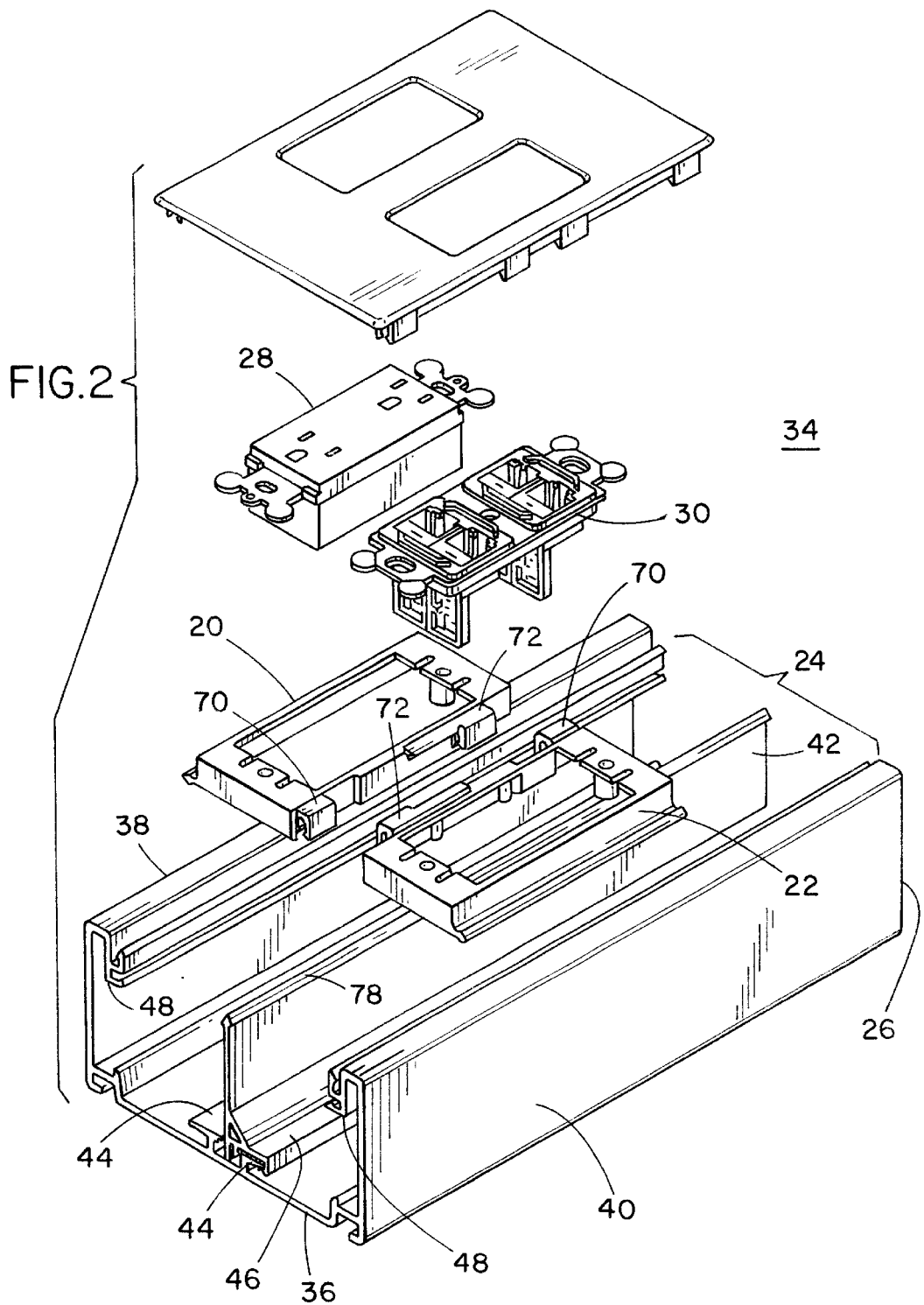
FIG. 2 is an exploded view of the device bracket and surface raceway system of FIG. 1.

FIG. 2 is an exploded view of the preferred elements of the device bracket and raceway system assembly 34 shown in FIG. 1. The substantially U-shaped raceway 26 has a horizontal base 36 and two parallel vertical sidewalls 38, 40 attached to the base 36 and disposed perpendicular and upward therefrom. A divider 42 is removably attached to one of a plurality of parallel bottom lugs 44 disposed adjacent a central longitudinal axis of the raceway base 36. The vertically oriented divider wall 42 is disposed in alignment with the longitudinal axis of the raceway base 36 when the latching element 46 of the divider engages one of the bottom lugs 44. This central wall 42 extends upward from the base 36 and is positioned between the sidewalls 38, 40 to preferably separate the raceway 26 into discrete electrical power and communication channels as required by current industry standards. Disposed atop each vertical raceway sidewall 38, 40 along the interior portion thereof, is a dual-latching element 48, having horizontal and vertical latching components 50 and 52, respectively. The device brackets 20, 22 are attached to a horizontal raceway latching component 50 on one side wall and the central divider wall 42 of the other. The raceway covers (not shown) attach to the vertical raceway latching components. The order of assembly is more clearly shown. It should be understood that the device bracket may be used with a surface raceway system one-half the width of that shown herein (not shown)

Figure 3:
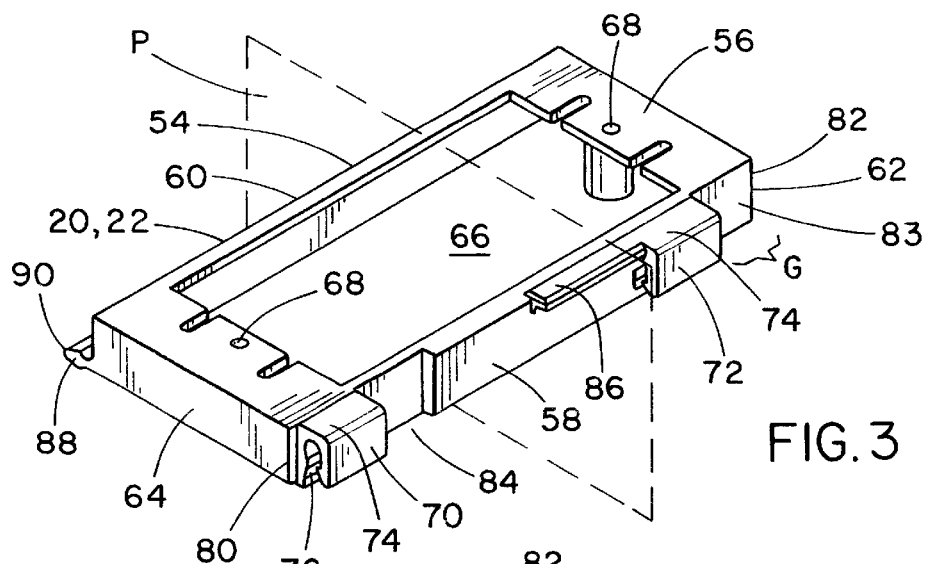
FIG. 3 is a top right perspective view of an embodiment of a device bracket to be used with the device bracket and surface raceway system of FIGS. 1 and 2.

FIG. 3 is a top right perspective view of the device bracket 20, 22. As seen in this view, the device bracket 20, 22 has a main body 54 having a top 56, two longitudinal sides 58, 60 depending therefrom, and two end portions 62, 64 depending therefrom laterally connecting the two longitudinal sides 58, 60. As shown in FIG. 3, the two longitudinal sides 58, 60 and the two end portions 62, 64 are attached to one another and the top 56. Disposed within the top 56 is a generally rectangular-shaped aperture 66 for receiving and mounting a respective electrical power or communication outlet assembly. A plurality of fastener apertures 68 are also disposed on the top 56 about the exterior of the rectangular aperture perimeter which communicate with mounting bosses disposed below the top. Preferably a plurality of divider wall mounting assemblies 70, 72 are disposed at discrete, individual locations on the first longitudinal side 58. Each mounting assembly 70, 72 is generally a block-shaped structure which extends laterally a given distance from the first longitudinal side 58, and extends longitudinally a given distance along the first longitudinal side 58. A top surface 74 is provided on each mounting assembly 70, 72 disposed slightly above the main body top 56. An end surface 83 is disposed at the furthest lateral extent parallel to the first longitudinal side. Two side portions of each mounting assembly 70, 72 have a notch or groove 76 formed therein, which is continuous along the bottom portion longitudinal extent of the assembly, forming a groove shaped to receive a conventional latch projection 78 located atop the central divider wall 42. As shown in FIGS. 2–5, the notches or grooves 76 for an individual mounting assembly 20, 22 are aligned with one another.

A second mounting assembly 70 is disposed immediately adjacent an end 80 of the first longitudinal side 58 at the intersection of the first longitudinal side 58 and the second end portion 64. A first mounting assembly 72 is disposed on the first longitudinal side 58 at a position nearer the first end 82 of the first longitudinal side 58 so that the first mounting assembly 72 is spaced from the intersection of the first longitudinal side 58 and the first end portion 62 by a certain distance generally equivalent to the longitudinal extent of the second mounting assembly 70. As shown in FIGS. 2–5, a gap G is formed between the first mounting assembly 72 and the first end 82 of the first longitudinal side 58. In addition, the second mounting assembly 70 has a lateral or longitudinal dimension that is less than or equal to a lateral or longitudinal dimension of the gap G. As shown in FIG. 3, the mounting assemblies 70, 72 are distributed unequally with respect to a plane P (denoted by dashed lines) that lies midway between the two ends 80, 82 of the first longitudinal side 58 such that the first mounting assembly 72 does not intersect the position where a mirror image of the second mounting assembly 70 would be with respect to the plane P.

Additional mounting assemblies may be added as required. A receiving notch 84 generally equivalent in longitudinal extent and other dimensions to the first mounting assembly 72, is formed in the first longitudinal side 58 directly adjacent the second mounting assembly 70 in order to provide relief for the first mounting assembly 72 of a second device bracket 22 when two device brackets 20, 22 are used in a raceway 26, as shown here, and positioned back-to-back, or side-to-side, often referred to as laterally aligned.

The top surface 74 of the first mounting assembly 72 has a further longitudinal extension 86 that extends in the direction of the second mounting assembly 70, wherein the second mounting assembly 70 does not have an extension similar to extension 86 attached thereto. As shown in FIGS. 2–5, the extension 86 covers a portion of the space separating the two mounting assemblies 70, 72. As shown in FIGS. 2–5, the covered portion of space has a length that is substantially equal to the distance between the two mounting assemblies 70, 72 less the longitudinal dimension of the first mounting assembly 72. This extension 86 cooperates with the central divider 42 and/or extension 86 of another device bracket 22 to assist in the isolation of the power channel from the communication channel as shown in FIG. 1.

Figure 4:
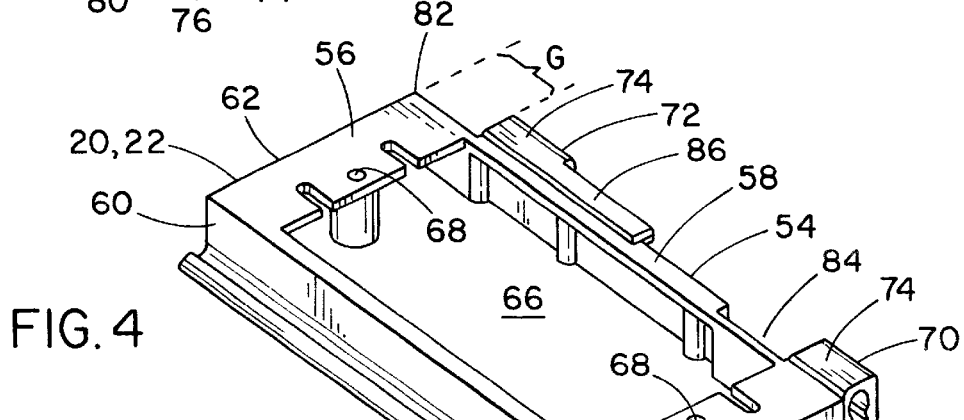
FIG. 4 is a top left perspective view of the device bracket of FIG. 3.

FIG. 4 is a top left perspective view of the device bracket 20, 22. Disposed on the second longitudinal side or wall 60 is a raceway mounting structure 88. This mounting structure 88 extends the entire length of the second longitudinal wall or side 60, from a first end to a second end, and has a latch-shaped form 90 disposed on the distal end to cooperate and engage the horizontal raceway latching structure 50 of one of the sidewalls 38, 40 to attach a bracket device 20, 22 to one of the sidewalls 38, 40.

Figure 5:
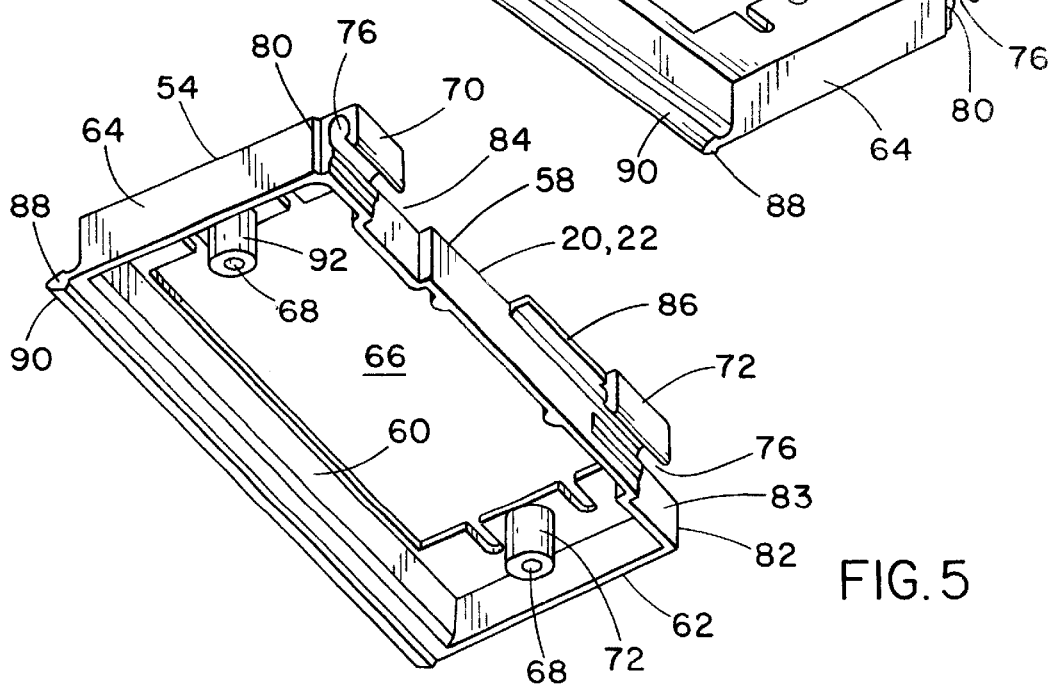
FIG. 5 is a bottom perspective view of the device bracket of FIG. 3.

FIG. 5 is a bottom perspective view of the device bracket 20, 22. More clearly shown herein are the fastener mounting bosses 92 for securing the respective electrical power and communication receptacles 28 and 30. Additionally, each divider wall 42 and raceway mounting structure can be seen. The first mounting assembly extension 86 clearly extends toward the second mounting assembly 70 and covers a portion of the gap created when two brackets 20, 22 share a common divider wall 42 as designed.

Figure 6:
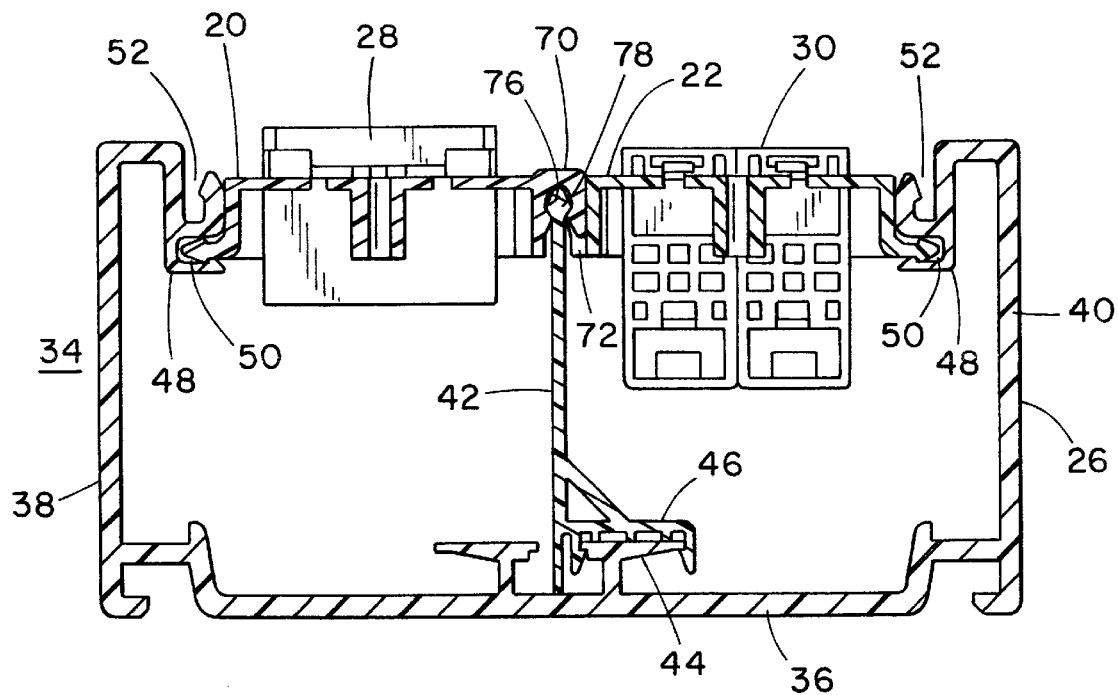
FIG. 6 is a front end cross-sectional view of the device bracket and surface raceway system of FIG. 1 taken along line 6—6 of FIG. 1.
Figure 7:
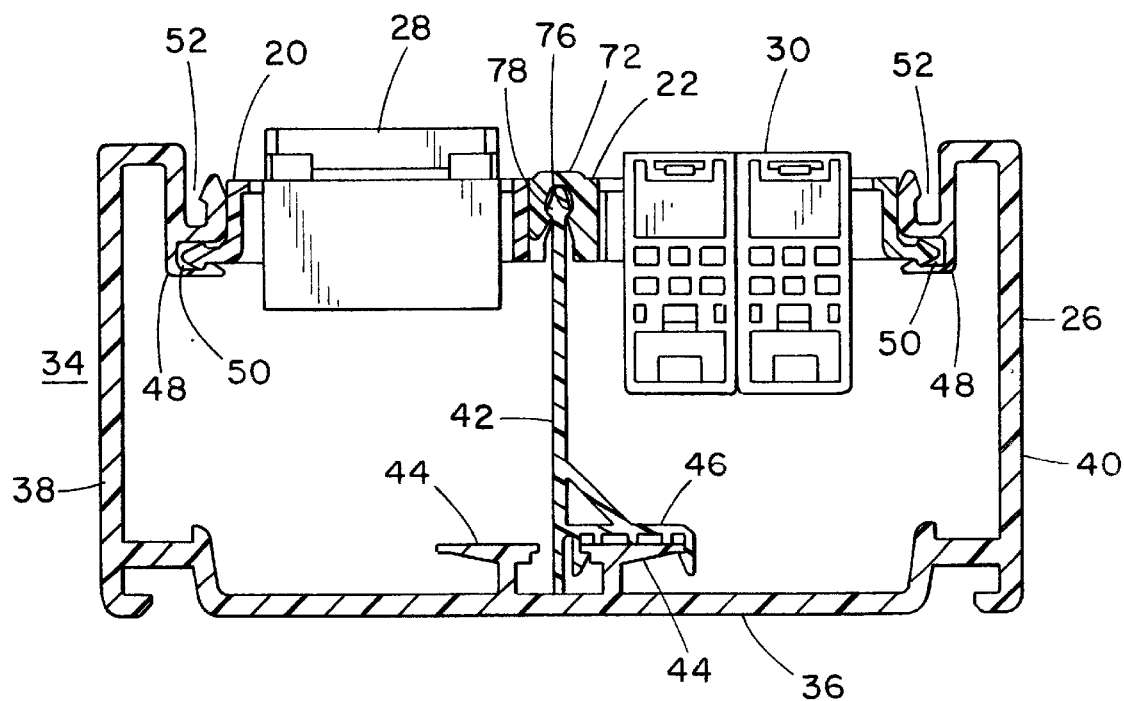
FIG. 7 is a front end cross-sectional view of the device bracket and surface raceway system of FIG. 1 taken along line 7—7 of FIG. 1.

FIGS. 6 and 7 show a singularly designed device bracket 20 mounted with an identical copy of itself 22, either back-to-back or side-to-side on a raceway 26 which provides adequate mounting provisions for either respective electrical power or communication receptacles 28 and 30 that are aligned with and extend out of the apertures 66 of the top 56 of the device brackets 20, 22. The divider wall mounting assemblies 70, 72 of each device bracket 20, 22 share the common divider wall mounting location and are staggered along the longitudinal length of the center divider wall 42. Thus, only one cover for the plurality Of outlet receptacles is required and less disruption of the raceway system is the result.

In the case of side-to-side attachment of device brackets 20, 22 as shown in FIGS. 1 and 6–9, the second device bracket 22 preferably has the same structure as the first device bracket 20 and so the description regarding the components of the first device bracket 20 are equally applicable to the second device bracket 22. For example, the distribution of the mounting assemblies 70, 72 of the second device bracket 22 along its longitudinal side 54 is preferably substantially the same as the distribution of mounting assemblies 70, 72 of the first device bracket 20 along its longitudinal side 54. When the two device brackets 20 and 22 are attached to the raceway side-by-side, the device brackets 20 and 22 are attached to a common divider 42 while they are attached to different sidewalls 38 and 40, respectively. As shown in FIGS. 1, 6–7 and 9, side-by-side attachment results in the longitudinal sides 54 of each device bracket 20, 22 facing one another and being separated from one another by the divider 42. In addition, side-by-side attachment results in the mounting assemblies 70, 72 of the device brackets 20, 22 interleaving one another so that the mounting assemblies 70, 72 of the device bracket 20 are offset with respect to the mounting assemblies 70, 72 of the other device bracket 22. Side-by-side attachment also results in the portion of the divider 42 between the device brackets 20 and 22 being entirely covered due to the mounting assemblies 70, 72 and the extensions 86 as shown in FIG. 1 to provide improved isolation between the components attached to the device brackets. The current available alternatives stagger the receptacles along the raceway resulting in increased waste.

Figure 8:
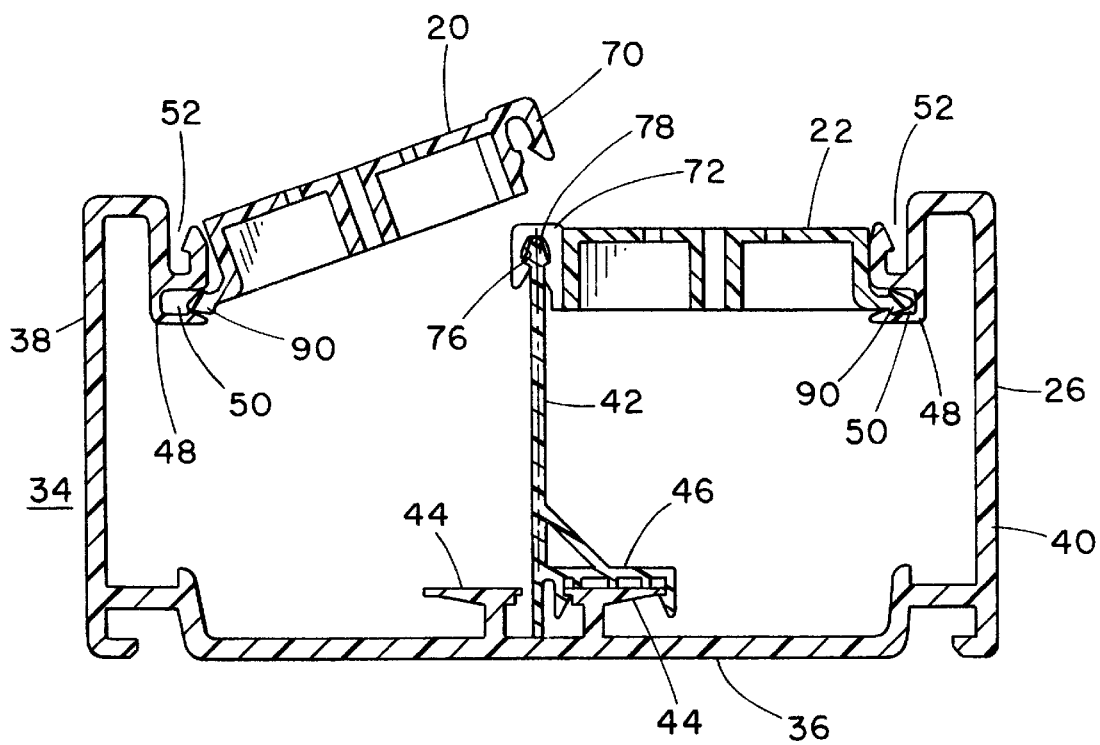
FIG. 8 is a front end sectional view of the device bracket and surface raceway system of FIG. 1 when a device bracket is in the process of being attached to the surface raceway system.

FIG. 8 is an end sectional view of the assembly of a plurality of device brackets 20, 22 back-to-back or side-to-side on a raceway system 26. Each device bracket 20, 22, being identical to the other, is installed in the exact same manner. In the case of device bracket 20, the device bracket raceway mounting structure 90 is first introduced into the horizontal mounting component 50 disposed adjacent the top interior of the raceway wall 38. The bracket 20 is then pivoted downwardly so that the divider wall mounting assemblies 70, 72 engage the center divider wall 42.

Figure 9:
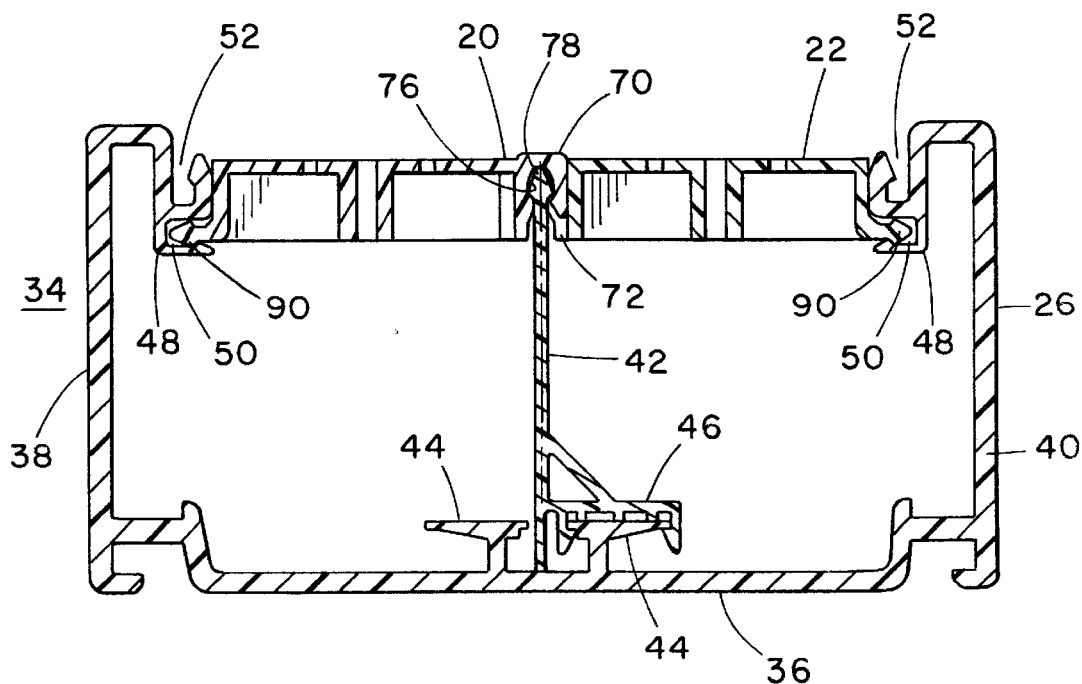
FIG. 9 is a front end sectional view of FIG. 8 after the device bracket has been attached so as to share central divider wall with another device bracket.

FIG. 9 is an end sectional view showing two device brackets 20, 22 installed in a raceway 26 with a shared central divider wall 42.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A device bracket system, comprising:
   a main body comprising:
      a top with an aperture;
      a longitudinal side depending from said top and having a first end and a second end;
      a second longitudinal side depending from said top;
      a first end portion depending from said top; and
      a second end portion depending from said top, wherein said first and second end portions laterally connect said longitudinal side and said second longitudinal side;
   an electrical receptacle or a communication receptacle mounted to said main body and aligned with said aperture;
   a first mounting assembly attached to said longitudinal side and being positioned so as to be nearer to said first end of said longitudinal side and so that a gap is formed between said first mounting assembly and said first end of said longitudinal side; and
   a second mounting assembly attached to said longitudinal side and spaced from said first mounting assembly, wherein said second mounting assembly has a longitudinal dimension that is less than or equal to a longitudinal dimension of said gap;
   wherein a distal end of said second longitudinal side has a latch-shaped form.

2. The device bracket system of claim 1, wherein said latch-shaped form extends the entire length of said second longitudinal wall.

3. The device bracket system of claim 1, wherein a groove is formed in said first mounting assembly.

4. The device bracket system of claim 3, wherein a second groove is formed in said second mounting assembly and said first groove is aligned with said second groove.

5. The device bracket system of claim 1, wherein said first mounting assembly does not intersect the position where a mirror image of said second mounting assembly would be located with respect to a plane that lies midway between said first and second ends of said longitudinal side.

6. The device bracket system of claim 5, wherein said second mounting assembly is positioned adjacent to said second end of said longitudinal side.

7. The device bracket system of claim 1, wherein a receiving notch is formed adjacent to said second mounting assembly.

8. The device bracket system of claim 7, wherein said receiving notch has a longitudinal dimension that is generally equivalent to a longitudinal dimension of said first mounting assembly.

9. The device bracket system of claim 1, wherein said first mounting assembly comprises an extension that extends toward said second mounting assembly and covers a portion of a space separating said first and second mounting assemblies.

10. The device bracket system of claim 9, wherein said covered portion of space has a length that is substantially equal to the distance between said first and second mounting assemblies less a longitudinal dimension of said first mounting assembly.

11. A device bracket and raceway system, comprising:
    a raceway comprising:
       a base;
       a first sidewall attached to and extending upward from said base;
       a second sidewall attached to and extending upward from said base; and
       a divider attached to and extending upward from said base, wherein said divider is positioned between said first and second sidewalls;
    a device bracket that is not attached to said second sidewall and comprising:
       a top having an aperture;
       a first longitudinal side attached to said top and having a first end and a second end; and
       a first mounting assembly attached to said longitudinal side and said divider; and
    an electrical receptacle or a communication receptacle mounted to said device bracket and aligned with said aperture;
    said mounting assembly being positioned so as to be nearer to said first end of said longitudinal side and so that a gap is formed between said first mounting assembly and said first end of said longitudinal side;
    said system further including a second mounting assembly attached to said longitudinal side and said divider, wherein said second mounting assembly has a longitudinal dimension that is less than or equal to a longitudinal dimension of said gap.

12. The device bracket and raceway system of claim 10, wherein said device bracket comprises a second longitudinal side that is attached to said second sidewall.

13. The device bracket and raceway system of claim 11, wherein said device bracket further comprises a second longitudinal side attached to said top and having a distal end having a latch-shaped form that engages a latching component formed in said first sidewall.

14. The device bracket and raceway system of claim 11, wherein a groove is formed in said first mounting assembly; and
    a second groove is formed in said second mounting assembly and said first groove is aligned with said second groove.

15. The device bracket and raceway system of claim 11, wherein said first mounting assembly does not intersect the position where a mirror image of said second mounting assembly would be located with respect to a plane that lies midway between said first and second ends of said longitudinal side.

16. The device bracket and raceway system of claim 15, wherein said second mounting assembly is positioned adjacent to said second end of said longitudinal side.

17. The device bracket and raceway system of claim 11, wherein a receiving notch is formed adjacent to said second mounting assembly.

18. The device bracket and raceway system of claim 17, wherein said receiving notch has a longitudinal dimension that is generally equivalent to a longitudinal dimension of said first mounting assembly.

19. The device bracket system of claim 11, wherein said first mounting assembly comprises an extension that extends toward said second mounting assembly and covers a portion of a spaced separating said first and second mounting assemblies.

20. The device bracket and raceway system of claim 19, wherein said covered portion of space has a length that is substantially equal to the distance between said first and second mounting assemblies less a longitudinal dimension of said first mounting assembly.

21. A device bracket and raceway system, comprising:
   a raceway comprising:
      a base;
      a first sidewall attached to and extending upward from said base;
      a second sidewall attached to and extending upward from said base; and
      a divider attached to and extending upward from said base,
   wherein said divider is positioned between said first and second sidewalls;
   a first device bracket that is attached to said first sidewall and is not attached to said second sidewall and comprising:
      a first longitudinal side having a first end and a second end; and
      a first mounting assembly attached to said first longitudinal side and said divider;
   a second device bracket that is attached to said second sidewall and is not attached to said first sidewall and comprising:
      a second longitudinal side having a third end and a fourth end, wherein said second longitudinal side faces said first longitudinal side and is separated therefrom by said divider; and
      a second mounting assembly attached to said second longitudinal side and said divider, wherein said second mounting assembly is offset from said first mounting assembly;
   a first electrical receptacle or a first communication receptacle mounted to said first device bracket.

22. The device bracket and raceway system of claim 21, wherein said first mounting assembly is positioned so as to be nearer to said first end of said first longitudinal side and so that a gap is formed between said first mounting assembly and said first end of said first longitudinal side.

23. The device bracket and raceway system of claim 22, further comprising:
   a third mounting assembly attached to said first longitudinal side and said divider, wherein said third mounting assembly has a longitudinal dimension that is less than or equal to a longitudinal dimension of said gap.

24. The device bracket and raceway system of claim 23, wherein said first mounting assembly does not intersect the position where a mirror image of said third mounting assembly would be located with respect to a plane that lies midway between said first and second ends of said first longitudinal side.

25. The device bracket and raceway system of claim 24, wherein said third mounting assembly is positioned adjacent to said second end of said first longitudinal side.

26. The device bracket and raceway system of claim 25, further comprising:
   a fourth mounting assembly attached to said second longitudinal side and said divider, wherein said fourth mounting assembly is offset from both said first and third mounting assemblies.

27. The device bracket and raceway system of claim 26, wherein the distribution of said first and third mounting assemblies on said first longitudinal side is substantially the same as the distribution of said second and fourth mounting assemblies on said second longitudinal side.

28. The device bracket and raceway system of claim 23, further comprising:
   a fourth mounting assembly attached to said second longitudinal side and said divider, wherein said fourth mounting assembly is offset from both said first and third mounting assemblies.

29. The device bracket and raceway system of claim 28, wherein the distribution of said first and third mounting assemblies on said first longitudinal side is substantially the same as the distribution of said second and fourth mounting assemblies on said second longitudinal side.

30. The device bracket and raceway system of claim 24, further comprising:
   a fourth mounting assembly attached to said second longitudinal side and said divider, wherein said fourth mounting assembly is offset from both said first and third mounting assemblies.

31. The device bracket and raceway system of claim 30, wherein the distribution of said first and third mounting assemblies on said first longitudinal side is substantially the same as the distribution of said second and fourth mounting assemblies on said second longitudinal side.

32. The device bracket and raceway system of claim 21, further comprising a second electrical receptacle or a first communication receptacle mounted to said second device bracket.

* * * * *